(12) United States Patent
Harnett et al.

(10) Patent No.: US 7,746,619 B2
(45) Date of Patent: Jun. 29, 2010

(54) SOFT START CLUTCH CONTROLLER

(75) Inventors: Sean O. Harnett, Penfield, NY (US); David L. Sestito, Fairport, NY (US)

(73) Assignee: Sendec Corporation, Fairport, NY (US)

( * ) Notice: Subject to any disclaimer, the term of this patent is extended or adjusted under 35 U.S.C. 154(b) by 257 days.

(21) Appl. No.: 11/741,475

(22) Filed: Apr. 27, 2007

(65) Prior Publication Data
US 2008/0264747 A1   Oct. 30, 2008

(51) Int. Cl.
H01H 9/00 (2006.01)
(52) U.S. Cl. .................................. 361/139; 361/160
(58) Field of Classification Search ................. 361/139, 361/143, 144, 160
See application file for complete search history.

(56) References Cited

U.S. PATENT DOCUMENTS

| | | | |
|---|---|---|---|
| 4,289,222 A | | 9/1981 | Esthimer |
| 4,509,091 A | | 4/1985 | Booth |
| 4,620,261 A | * | 10/1986 | Thornton ..................... 361/154 |
| 4,646,896 A | | 3/1987 | Hammond et al. |
| 4,805,751 A | | 2/1989 | Ohkumo et al. |
| 5,083,273 A | | 1/1992 | Nishiwaki et al. |
| 5,094,333 A | | 3/1992 | Mimura |
| 5,414,627 A | | 5/1995 | Wada et al. |
| 5,920,160 A | | 7/1999 | Yamada et al. |
| 5,993,350 A | | 11/1999 | Lawrie et al. |
| 6,208,498 B1 | * | 3/2001 | Ueda .......................... 361/160 |
| 6,267,189 B1 | | 7/2001 | Nielsen et al. |
| 6,547,699 B2 | | 4/2003 | Eich et al. |
| 6,849,027 B2 | | 2/2005 | Eich et al. |
| 2002/0055415 A1 | | 5/2002 | Yoshikawa et al. |

FOREIGN PATENT DOCUMENTS

| | | |
|---|---|---|
| JP | 61200561 A | 9/1986 |
| JP | 3137452 A | 6/1991 |

OTHER PUBLICATIONS

Components for Drivelines, Basics of Design engineering, http://www.machinedesign.com/BDE/mechanical/bdemech1/mdemech1_1.htm., Jun. 7, 2005 - 4 pages.
GlobalSpec the Engineering Search Engine, Electric Clutches Specifications, Jun. 7, 2005, http://www.globalspec.com/ specifications/speechelpall?name=ElectricClutch&comp=89, 6 pages.

* cited by examiner

Primary Examiner—Danny Nguyen
(74) Attorney, Agent, or Firm—Stephen B. Salai, Esq.; Brian B. Shaw, Esq.; Harter Secrest & Emery LLP

(57) ABSTRACT

A clutch actuator for an electromechanical clutch having a solenoid actuating coil initially provides power to the solenoid at a high rate by using a high duty cycle pulse with a modulated controller. When the initial engagement of the clutch elements is sensed by a decrease in current, the duty cycle of the pulse with modulator is reduced and thereafter increased in a control fashion to accomplish a soft start.

13 Claims, 8 Drawing Sheets

SOFT START CLUTCH CONTROLLER

CROSS-REFERENCE TO RELATED APPLICATIONS

N/A

STATEMENT REGARDING FEDERALLY SPONSORED RESEARCH OR DEVELOPMENT

None

REFERENCE TO A "SEQUENCE LISTING"

Not applicable.

BACKGROUND OF THE INVENTION

1. Field of the Invention

This invention relates generally to the actuation of electromagnetic clutches and more particularly to a controller for such clutches that reduces the stresses associated with engagement of the clutches by providing a progressive or soft start.

2. Description of Related Art

Electromagnetic clutches are used in a variety of applications, including coupling large and small engines and motors to equipment operated by the engines or motors. Especially in the case of relatively small engines and motors, the price of clutch controllers is a significant factor in the implementation of such controllers. However, small engine applications also benefit significantly from controlling the abrupt engagement of clutches since such engagement may increase wear, resulting in undesirable operating characteristics such as jerking, or cause the engine to stall if the clutch is engaged abruptly.

There have, in the past, been some efforts made towards reducing the abruptness of clutch engagement. Such methods have taken various forms, including mechanical arrangements that suffer from the disadvantage that they are complex and expensive, and electrical arrangements that have provided less than optimal results. Since an electromagnetic, clutch requires a clutch controller for controlling power applied to the clutch, it would be desirable to combine such controller with method and apparatus for providing for gradual engagement of the clutch in a single unit. This invention provides such method and device.

In almost all instances, an electromagnetic clutch includes a coil or solenoid through which a current is passed to actuate the clutch and an at least partially ferrous core that is arranged to be drawn into the coil when current is supplied to the coil. The core is mechanically connected to the clutch mechanism so that when power is applied to the coil and the core is drawn into the coil, the clutch mechanism is moved from a disengaged to an engaged position. This invention controls the actuation of the clutch by controlling the current passing through the coil to provide for a gradual engagement of the clutch rather than an abrupt engagement. This invention relies on the characteristic of a solenoid type of clutch actuator that the inductance of a solenoid increases as the core is drawn into the body of the solenoid. Since, the core is mechanically connected to the clutch, movement of the core is directly related to the position and therefore the state of the clutch and by taking advantage of this, the present invention permits the position of the clutch to be determined from the increase in the inductance of the coil that occurs as the core is drawn into the coil.

Because the current flowing through the coil will tend to increase with time, according to a well-known relationship, the actual current through a coil as a function of time can be predicted relatively accurately. Where the inductance of the coil increases quickly enough as the core moves into the coil, the current through the coil will decrease rather than increase as a function of time, and by monitoring the current through the coil and recognizing this decrease in current as the clutch begins to engage, the present invention provides a method and apparatus for controlling the engagement of the clutch to provide a soft start.

It is desirable to provide a clutch controller that automatically adjusts for different clutch models. Clutches come in many different sizes, larger clutches requiring more current than smaller clutches, in prior art controllers, predetermined absolute current set points have been used to control the operation of the clutches. For example, a controller might initiate a ramp at a starting point of 1.2 amps for three amp clutch, and a starting point of 2 amps for a 5 amp clutch.

As clutches wear, more current is required to activate them. Consequently, if a fixed current is employed at the beginning of the ramp portion of the clutch activation, the clutch may disengage. Since absolute current set points always produce the same ramp current profile regardless of wear, controllers using this technique may be unreliable.

Another problem of known controllers is that the current ramp increases the current slowly from a preset value to 100%. In practice, the clutch is fully engaged at a value somewhat less than 100% and continuing the ramp past this value may cause clutch slippage and overheating.

A still further problem associated with known clutches is that clutches do not always engage squarely, especially if they are worn. If a clutch pulls in obliquely, a current sensor may indicate a false engagement when one portion of the clutch plate touches the opposite clutch plate.

While a variety of methods for controlling the current passing through the clutch may suggest themselves to those skilled in the art, and in accordance with the invention, it is preferred to control the current through the use of a pulse width modulator which can be adjusted to provide a controlled amount of current to the coil of the clutch and thereby to accomplish a soft start.

BRIEF SUMMARY OF THE INVENTION

In accordance with a presently preferred embodiment of the invention, current through the coil of a clutch actuator is initially sent to a high value by establishing a high duty cycle for a pulse width modulated controller. When a decrease in current through the clutch is sensed, thereby indicating that engagement of the clutch has begun, the duty cycle of the pulse width modulator is reduced quickly and thereafter increased in a controlled fashion to accomplish a soft start.

In accordance with another aspect of the invention, if desired, once the clutch is fully engaged, the current through the coil may be reduced to a holding value that is somewhat less than the current required to actuate the clutch by adjusting the duty cycle of the pulse width modulated control power to a holding value. This feature reduces solenoid coil heat dissipation, thereby enabling the use of a higher power solenoid than would be possible without this control.

While the novel aspects of the invention are set forth with particularity in the appended claims, the invention itself together with further objects and advantages thereof may be more readily comprehended by reference to the following detailed description thereof taken in conjunction with the accompanying drawing in which:

BRIEF DESCRIPTION OF THE SEVERAL VIEWS OF THE DRAWING(S)

DETAILED DESCRIPTION OF THE INVENTION

Figure 1:
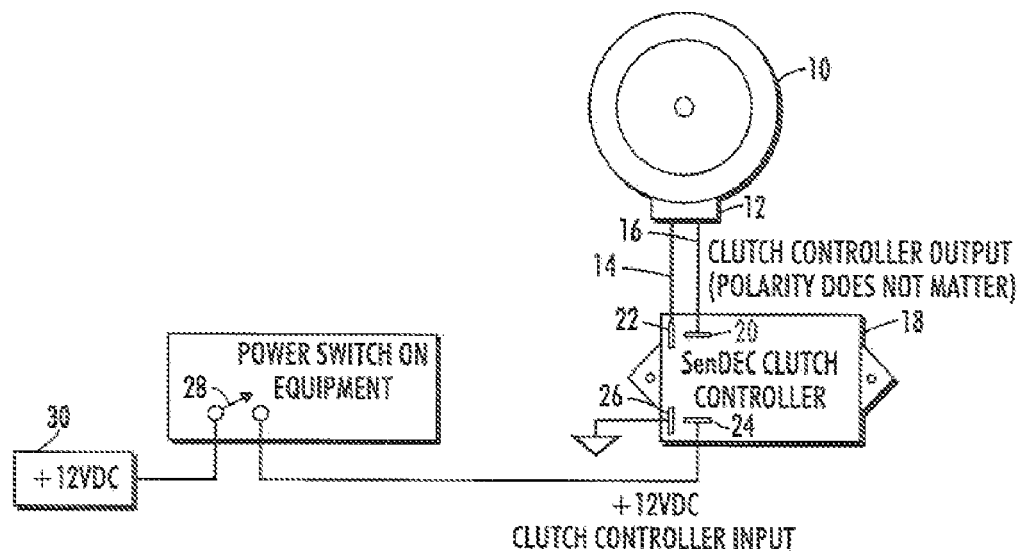
FIG. 1 is a diagrammatic view of an arrangement for actuating an electric clutch utilizing the self start clutch controller of this invention.

FIG. 1 is a diagrammatic view of a clutch arrangement utilizing a clutch controller in accordance with this invention. A clutch 10 includes an input connector 12 for connecting clutch 10 to clutch controller 18 by way of first and second electrical conductors 14 and 16. Conductors 14 and 16 are connected to output terminals 20 and 22 of clutch controller 18. Clutch controller 18 also includes input terminals 24 and 26. Input terminal 28 is conventionally connected to ground while input terminal 24 is connected to a source of 12 volt DC power such as a battery 30 by way of a power switch 28. When power switch 28 is closed, clutch controller 18 applies power to clutch 10 by way of connector 12 as will be described in more detail below.

Figure 2A:
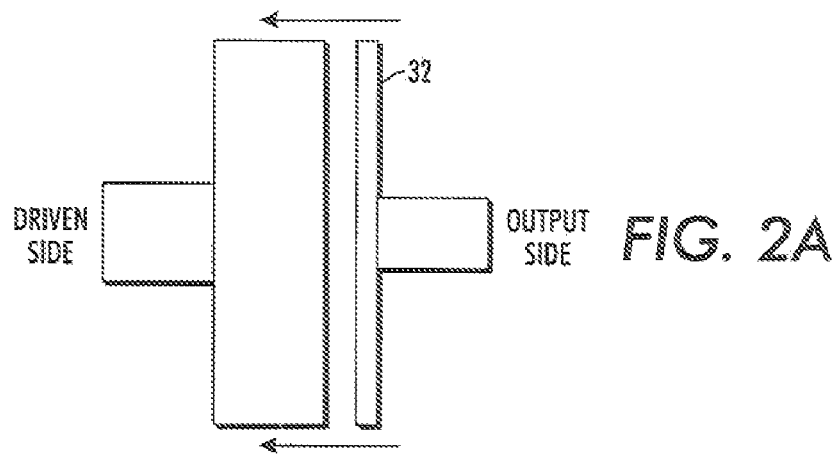
FIG. 2 is a diagrammatic view of the idealized engagement of a clutch of the type to which the invention relates.
Figure 2B:
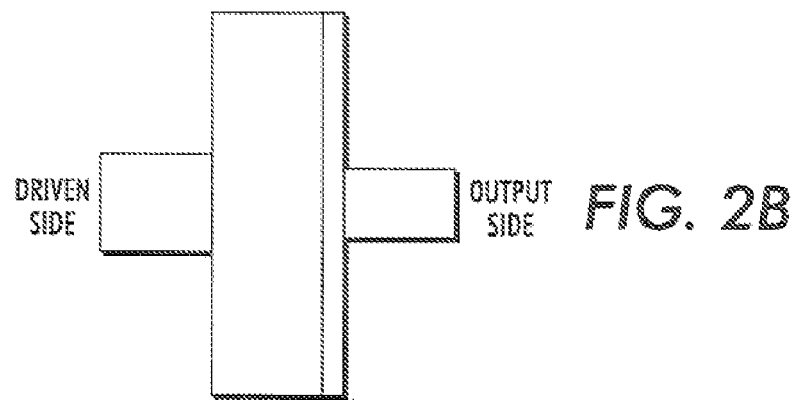
Figure 3A:
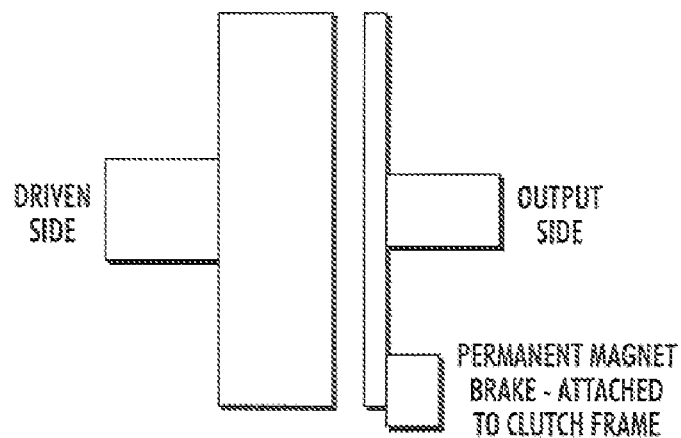
FIG. 3 is a diagrammatic view of the typical engagement of a clutch of the type to which this invention relates.
Figure 3B:
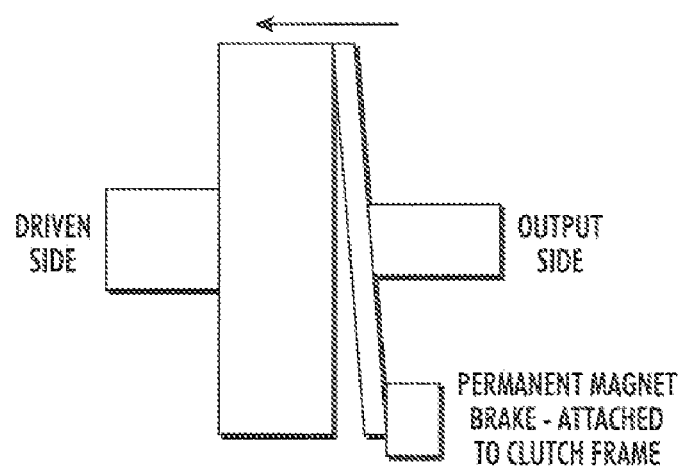
Figure 3C:
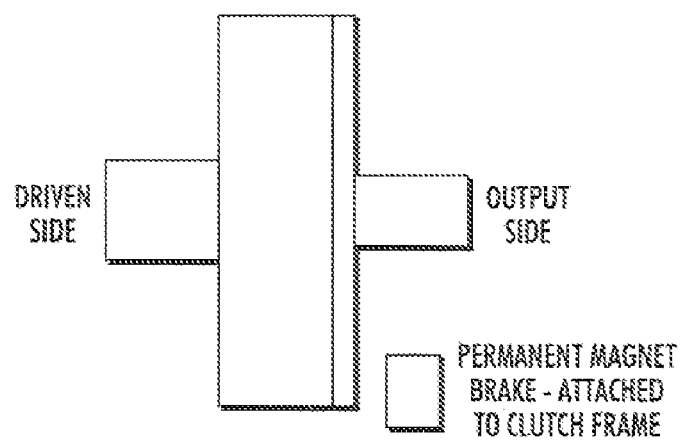

FIGS. 2 and 3 are diagrammatic illustrations showing clutch engagement under ideal and typical circumstances. As shown in FIGS. 2(a) and 3(a), when disengaged, the clutch driven side and the clutch output side are spaced apart so that no power is transferred between them and moreover the outside clutch plate is ideally disposed parallel to the driven side clutch plate. As the clutch is drawn in, and in an ideal clutch, the output side clutch plate remains parallel to the driven side clutch plate as shown in FIG. 2(b) and engages substantially simultaneously over the entire surface.

In practice, as shown in FIG. 3, while it is often possible to maintain the driven side and output side clutch plates essentially parallel when the clutch is disengaged, when the clutch is engaged, the output side clutch plate may contact the driven side clutch plate obliquely as shown in FIG. 3(b) and subsequently move into the position shown in FIG. 2(b). Some clutch manufactures use a permanent magnet brake on the back side of the clutch plate which further exaggerates this problem. This invention allows for this common effect.

Figure 4:
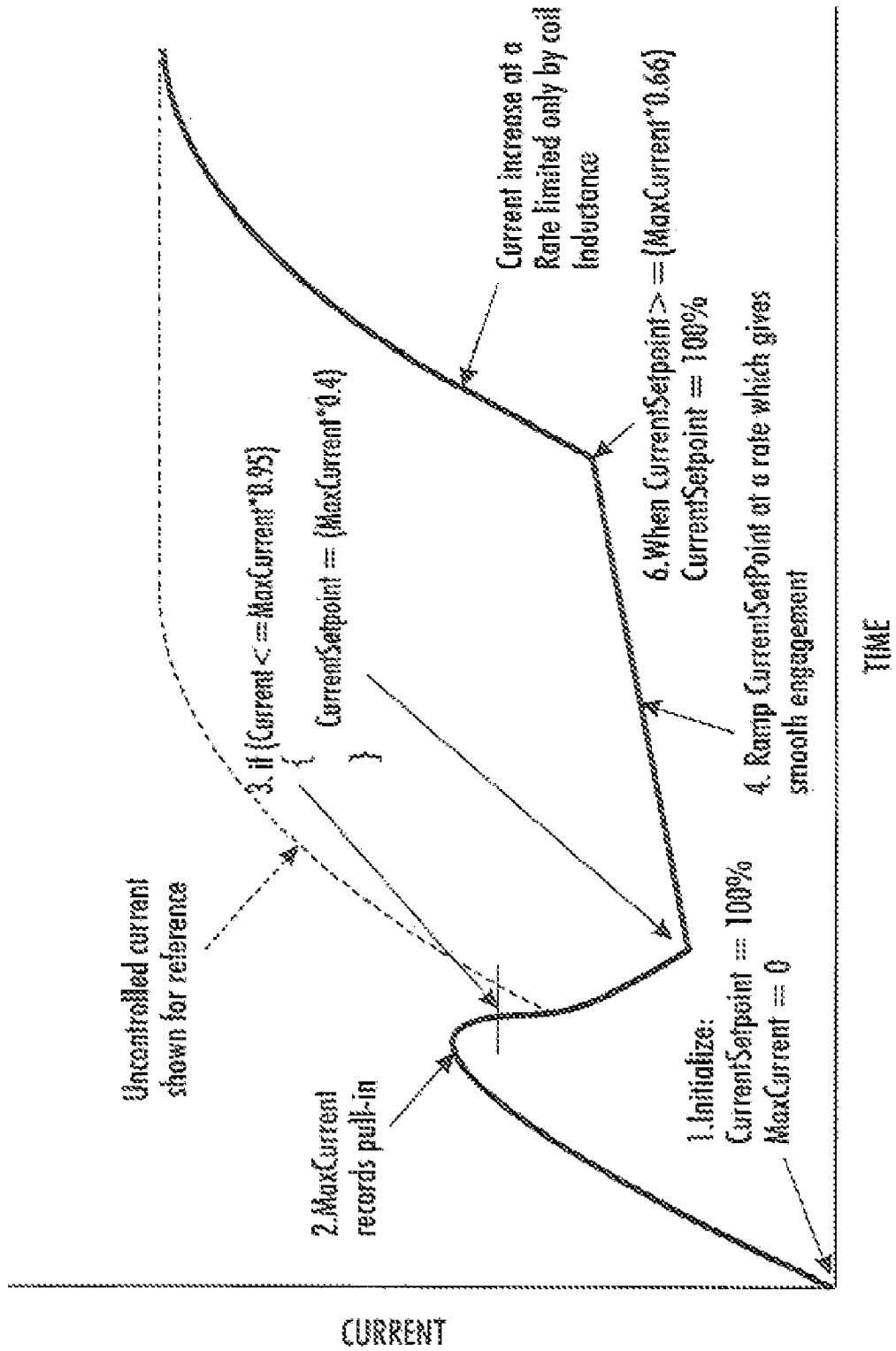
FIG. 4 is a graphical representation of the current flowing through a clutch solenoid in accordance with one aspect of this invention.
Figure 5:
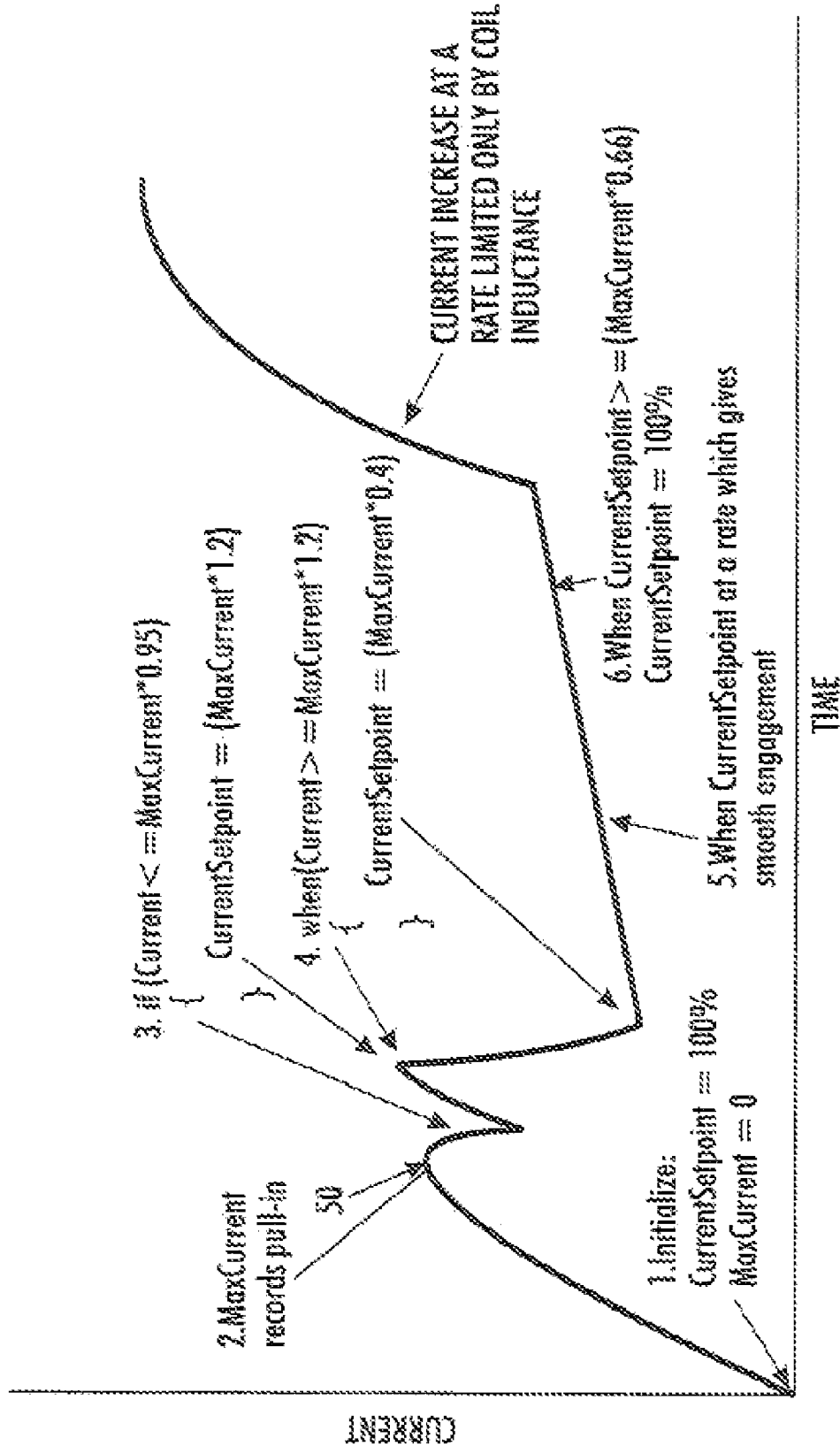
FIG. 5 is a graphical representation of the current through a solenoid in accordance with another aspect of this invention.

FIGS. 4 and 5 are graphical representations of the current applied to a clutch solenoid in accordance with first and second embodiments of the invention. Referring to FIG. 4, the current is shown on a vertical axis against time shown on the horizontal axis. When the clutch is engaged, for example when switch 28 as shown in FIG. 1 is closed, the current begins to increase with time at a rate determined primarily by the inductance of the clutch solenoid. As the current increases, the clutch controller monitors the current and detects a local maximum at 50 where the current begins to decrease. Normally, this maximum occurs at the point where the clutch plate begins to move toward the driven side of the clutch, just before contact is first made between the driven side and the output side of the clutch. When the current through the clutch solenoid decreases to 95% of the maximum current, the start of clutch engagement is declared. At this point the maximum current is stored as "reference current", and power to the clutch solenoid is removed and the current begins to decrease with time at a rate again determined primarily by the inductance of the solenoid.

When the current falls to 40% of the reference currents current is again supplied to the clutch solenoid but at a controlled rate to facilitate a smooth engagement of the clutch. Preferably, the controlled rate is a linear ramp but other controlled increases in current are also contemplated. When the current reaches 66% of the reference current, the controlled ramp is terminated and current is applied to the coil at a rate limited only by the coil inductance. At this point, the clutch is fully engaged.

FIG. 5 shows a graph of the current through a clutch solenoid vs. time in accordance with another embodiment of the invention having an additional feature adapted to detect and compensate for uneven engagement of the clutch plates as shown in FIG. 3. The wave form of FIG. 5 compensates for partial pull in and which would otherwise be detected as full pull in and causing the current through the clutch solenoid to be reduced and the clutch to either disengage or, drag along the output disc edge until the ramp current increases to a point where the clutch disc pulls in fully which results in a delayed and abrupt engagement.

As shown in FIG. 5, when the maximum current is detected, a set point is established at 95% of the maximum current to detect the beginning of clutch engagement. When the current falls below 95% of the maximum current, the maximum current is saved as "reference current", a new set point is established at 1.2 times the reference current and power is continuously applied to the clutch until the new threshold is reached whereupon power to the clutch solenoid is removed and the current begins to decrease with time at a rate again determined primarily by the inductance of the solenoid to a point equal to 40% of the reference current. At this point, the current ramp up proceeds as already described in connection with FIG. 4.

This second embodiment allows for the initial reduction of current caused by the sort of uneven initial contact illustrated in FIG. 3(b) and it continues to apply current until a higher threshold is reached thereby ensuring that actual clutch contact has occurred.

Figure 6:
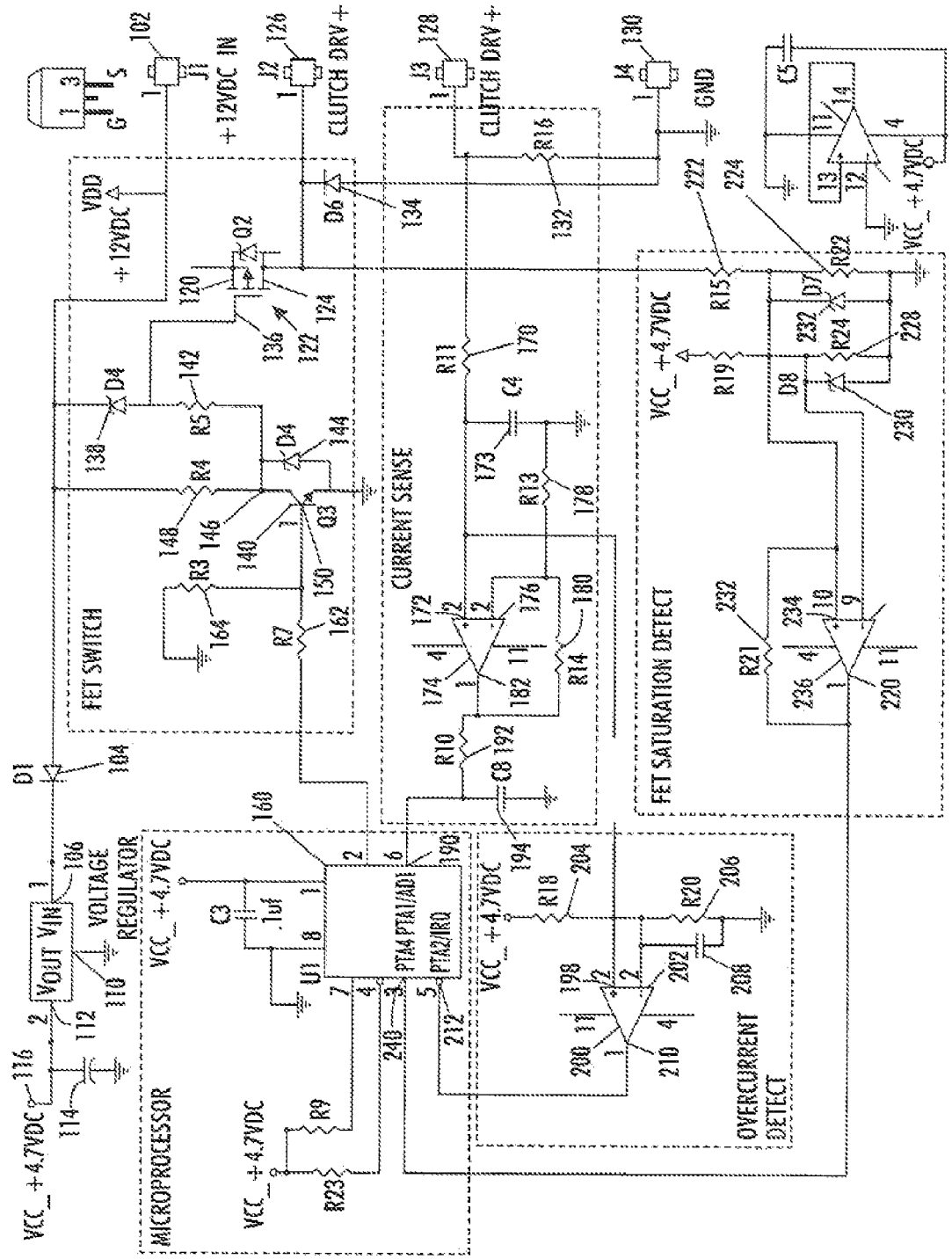
FIG. 6 is a schematic diagram of a clutch controller in accordance with this invention.

FIG. 6 is a schematic diagram of a clutch controller in accordance with a presently preferred embodiment of the invention. A power source such as a 12 V DC power source is connected to an input terminal 102. Terminal 102 is connected by way of a diode 104 to an input terminal 106 of a voltage regulator 108. Regulator 108 has a ground terminal 110 and an output terminal 112 that provides an operating voltage for example 4.7 V to the other elements of the clutch controller as will be discussed in more detail below. A filter capacitor 114 filters the output of voltage regulator 108 and the filtered output is available on terminal 116.

Input terminal 102 is also connected to the source terminal 120 of field effect transistor 122. Drain 124 of FET 122 is connected to a first clutch solenoid terminal 126. The other end of the clutch solenoid is connected to terminal 128 which is connected to ground through low resistance resistor 132 which may have resistance of approximately 0.1 ohm. Resistor 132 is connected in such a way that both the ON and OFF current through the clutch solenoid may be measured by sensing the voltage drop across resistor 132. Ground is connected to output terminal 130. A snubber diode 134 is connected between terminal 126 and ground to provide a path for the clutch solenoid recirculating current during the PWM off period.

Gate electrode 136 of FET 124 is clamped to a maximum gate-source voltage of approximately 10V by zener diode 138. Gate terminal 136 is connected to the collector of gate drive transistor 140 by current limiting resistor 142 which may have a value of approximately 390 ohms. The zener diode, preferably a 20 V zener diode 144 is connected between the collector and the emitter of transistor 140 to limit the voltage applied across transistor 140 during a "load-dump" transient. Load-dump transients can occur when the 12V battery is suddenly disconnected from a running engine's charging system. Zener diode 144 also forces FET 120 ON during the load dump, both to keep FET 144's drain-source voltage within safe limits and to help to suppress the load-dump by providing a load via the clutch. Collector 146 of transistor 140 is connected to the 12 volt source through resistor 148 which is preferably a 1.5 K. ohm resistor. Base 150 of transistor 140 is connected to an output of microcontroller 160 by a series resistor 162. Base resistor 164 is connected between the base 150 and ground and preferably has a value of approximately 2 K. ohms The current through the clutch solenoid coil is sensed as a voltage drop across resistor 132 which is connected through a filter comprising a series resistor 170 and a capacitor 173 to a non-inverting input 172 of a comparator 174. Preferably, resistor 170 has a value of approximately 2 K. ohms. An inverting input 176 of comparator 174 is connected to ground through a series resistor 178 which preferably has a value of about 1000 ohms. A feedback resistor 180 is connected between output 182 of comparator 174 and inverting input 176. The output of comparator 174 is connected to an input 190 of controller 160 through a filter comprising a series resistor 192 which preferably has a value of approximately 2 K. ohms and a capacitor 194 which preferably has a value of 0.01 µF.

The filtered current signal is connected to the inverting input 198 of a comparator 200 whose non-inverting input 202 is connected to a voltage divider comprising a first resistor 204 which preferably has a value of approximately 20 K. ohms and a second resistor 206 which preferably has a value of approximately 10 K. ohms. A filter capacitor 208 is connected in parallel with resistor 206. Comparator 200 provides a signal at output 210 when the current through the clutch solenoid exceeds a predetermined value set by the ratio of resistors 204 and 206. The current overload signal is applied to input 212 of controller 160 which is preferably an interrupt input.

The clutch controller uses a high side driver with the FET 122 switching the voltage provided to the clutch at terminal 126 and senses the current in the return path at terminal 128. In the case of an external short circuit to ground, the return path is bypassed. In this case the FET 122 could see a dangerously high current while the sense circuit measured zero current.

The FET drain-source saturation voltage is dependent on the current and the FET $R_{DSON}$ of 0.06 ohms. If the current is normal (<5 A), the FET will saturate to less than 0.3V across its drain-source. As the current increases the saturation voltage increases. Therefore, by monitoring the saturation voltage the approximate current through the FET can be sensed.

A saturation detector comparator 220 has a non-inverting input 234 connected to a first voltage divider comprising resistors 222 and 224 connected between the FET drain terminal 124 and ground, and a second inverting input 235 connected to a second voltage divider comprising resistors to 226 and 228 connected between FET source terminal 120 and ground. Zener diodes 230 and 232 limit the voltage is produced by the two voltage dividers to safe values but do not otherwise affect the comparison. Preferably, resistor 222 has a value of approximately 75 K. ohms, resistor 224 has a value of approximately 10 K. ohms, resistor 226 has a value of approximately 100 K. ohms, and resistor 228 has a value of approximately 10 K. ohms.

Comparator 220 preferably has a feedback resistor 232 which may have a value of 1 meg. ohm connected between its noninverting input 234 and its output 236 to provide a degree of hysteresis for the saturation detector. Output 236 of saturation detector 220 is connected to an input 240 of microcontroller 160.

Neglecting hysteresis resistor 232, the resistor ratios are set up for a comparator transition with the FET source 120 at 12V and the drain 124 at 9.27V. Therefore, if the drain is above 9.27V the comparator output 220 is high, below 9.27 it is low. This gives a drain-source maximum of 2.73V—this threshold was set high to ensure that there would be no false trips, it could be reduced significantly.

Figure 7:
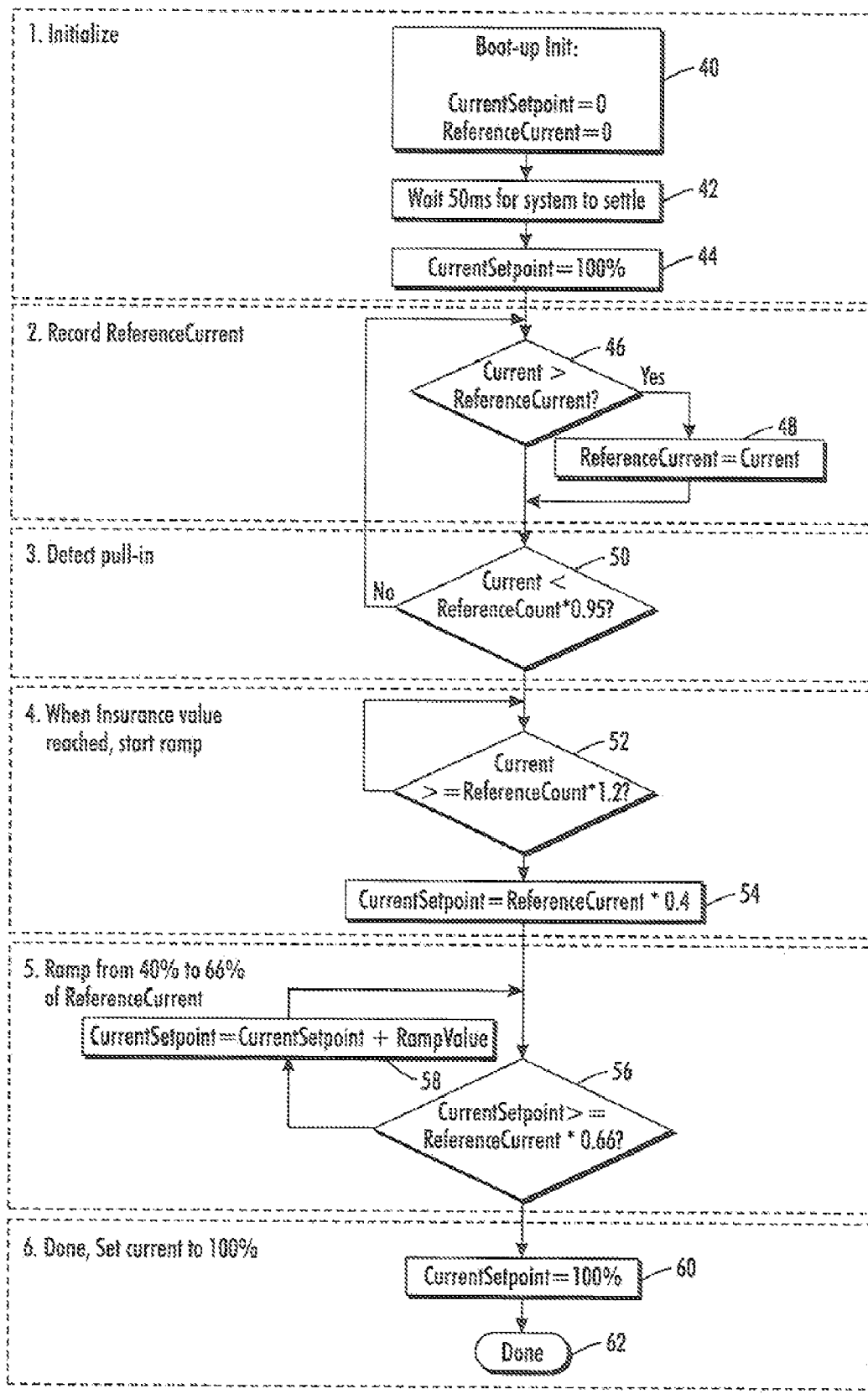
FIG. 7 is a software block diagram of the softstart algorithm for the clutch controller shown in FIG. 6.

FIG. 7 is a flowchart showing how the software in microcontroller 160 operates to implement the invention. On boot up, either upon the initial application of power or upon the system being reset, an initialization routine as shown at 40 is performed. The current set point is set to zero and the reference current is set to zero. A 50 ms delay occurs at 42 and the current set point is set to 100% at 44.

After the current set point and reference current have been initialized, the software enters a loop. The current is measured and compared to the reference current. If the current is greater than the reference current then the reference current is updated to equal the current as shown in boxes 46 and 48. This assures that the reference current will continue to increase as long as the present current or the current current, as it were, continues to increase. If the current is not greater than the reference current then the software determines whether it has fallen to less than 95% of the reference current in step 50. If it has not, the software loops back to box 46. If it has, the reference current is frozen at this maximum level and drive current remains applied to the solenoid and tested in block 52 until the current equals the reference current times 1.2 at which time the current set point is set to the reference current times 0.4 in box 54. At this point, the controlled soft start current ramp is initiated and the current is tested in block 56 until it reaches the reference current times 0.66. As long as the current remains below this value the current is increased by the ramp value in block 58 to maintain a constant controlled increase to accomplish the soft start function. Once the current reaches 0.66 times the reference current the current set point is set to 100% in block 60, full current is restored to the solenoid and the routine ends at 62. It will be seen that the software routine follows the current wave form shown in FIG. 5. The simpler wave form shown in FIG. 4 can be accomplished by eliminating flow chart blocks 52 and 54.

Figure 8:
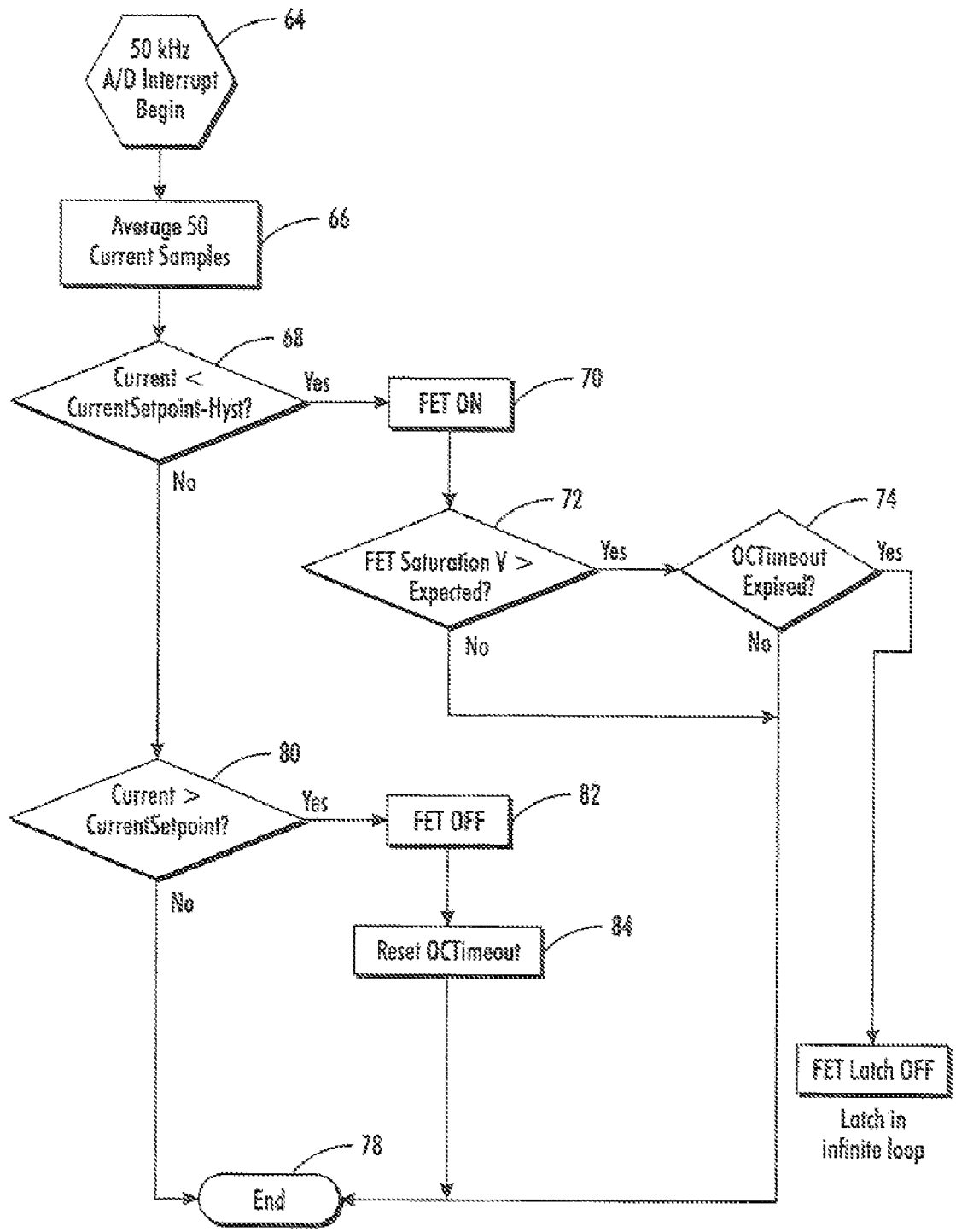
FIG. 8 is a software block diagram of the current control PWM algorithm for the clutch controller of FIG. 6.
Figure 9:
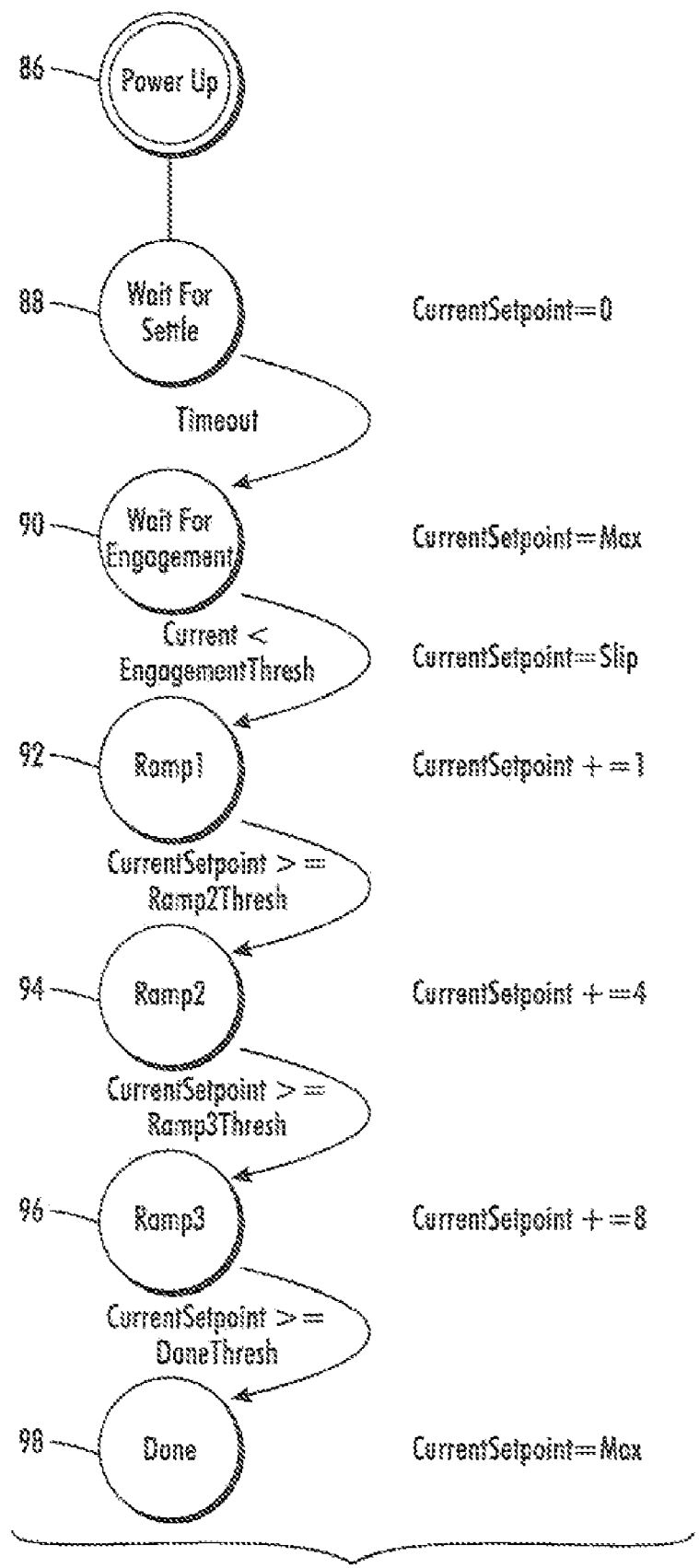
FIG. 9 is a state diagram of the current control set point algorithm for the clutch controller of FIG. 6.

FIG. 8 is a software block diagram showing the manner in which the controller shown in FIG. 6 controls the current through the clutch solenoid. The current is sampled by measuring a voltage across resistor 132 at a rate of 50 kHz. The analog to digital conversion occurs within controller 160. The current is averaged every 50 samples, that is approximately 1,000 times per second in block 66 and the average current is tested against the current set point minus hysteresis in block 68. If the current is below the current set point FET 123 is turned on in block 70 and the saturation detector 220 is tested in block 72. If the current is higher than the saturation current and the over current timeout has expired as tested at block 74 then the FET is latched off in block 76. As long as the saturation current is not exceeded or is exceeded only for a short time the routine terminates in block 78. Returning to block 68, if the current is greater than the current set point minus hysteresis and continues to increase until it is greater than the current set point as tested in block 80, the FET is turned off in block 82, the over current timeout is reset in block 84 and the routine terminates in block 78. If the current is not greater than the current set point as tested in block 80 then the routine terminates at block 78.

While the invention has been described in connection with certain presently preferred embodiments thereof, those skilled in the art will recognize that many modifications and changes may be made therein without departing from the true spirit and scope of the invention which accordingly is intended to be defined solely by the appended claims.

The invention claimed is:

1. A controller for an electrically operated solenoid actuated clutch comprising:
   a controllable power source coupled to the solenoid;
   a current sensor coupled to the solenoid, responsive to the current flowing in the solenoid and producing an output signal proportional to said current;
   a controller coupled to the power source and responsive to the output signal for increasing the current at a first rate to a maximum detected current, detecting a decrease in current to a preselected percentage of the maximum current, storing the maximum current as a reference current, reducing the current to a second preselected percentage of the reference current less than the first preselected percentage, increasing the current to a third preselected percentage of the reference current at a second rate lower than the first rate, and then increasing the current at the first rate.

2. The controller of claim 1 in which the first rate is limited essentially solely by the characteristics of the solenoid.

3. The controller of claim 1 in which the first preselected percentage is about 95%.

4. The controller of claim 1 in which the second preselected percentage is about 40%.

5. The controller of claim 1 in which the third preselected percentage is about 66%.

6. The controller of claim 1 in which the controller, after detecting the decrease in current to the preselected percentage of the reference current, increases the current at the first rate to a value equal to a fourth percentage of the reference current greater than the reference current, and then reduces the current to the second preselected percentage of the reference current.

7. The controller of claim 6 in which the fourth percentage is about 120%.

8. A method for smoothly engaging a solenoid actuated electromechanical clutch comprising:
   applying current to the solenoid at a first rate;
   monitoring the current flowing through the solenoid;
   detecting a first local current maximum;
   continuing to supply current to the solenoid;
   detecting an increase in current to a predetermined percentage of the first local current maximum; and
   reducing the amount of current supplied to the solenoid.

9. The method for smoothly engaging a solenoid actuated electromechanical clutch of claim 8 in which the step of reducing the amount of current supplied to the solenoid comprises supplying current to the side at a rate lower than the first rate.

10. The method for smoothly engaging a solenoid actuated electromechanical clutch of claim 8 in which the second local current maximum is greater than the first local current maximum.

11. The method for smoothly engaging a solenoid actuated electromechanical clutch of claim 10 comprising the further step of supplying current to the solenoid at the first rate.

12. A method for smoothly engaging a solenoid actuated electromechanical clutch comprising:
    applying current to the solenoid at a first rate;
    monitoring the current flowing through the solenoid;
    detecting a first local current maximum followed by a decrease in current greater than a predetermined amount and detecting a further increase in current beyond a predetermined percentage of the first local current maximum, and then;
    momentarily interrupting the flow of current to the solenoid; and
    supplying current to the solenoid at a rate lower than the first rate.

13. A method for smoothly engaging a solenoid actuated electromechanical clutch comprising:
    applying current to the solenoid at a first rate;
    monitoring the current flowing through the solenoid;
    detecting a first local current maximum followed by a decrease in current greater than a predetermined amount and detecting a further increase in current beyond the first local current maximum and then;
    supplying current to the solenoid at a rate lower than the first rate.

* * * * *

UNITED STATES PATENT AND TRADEMARK OFFICE
CERTIFICATE OF CORRECTION

PATENT NO. : 7,746,619 B2
APPLICATION NO. : 11/741475
DATED : June 29, 2010
INVENTOR(S) : Sean O. Harnett and David L. Sestito It is certified that error appears in the above-identified patent and that said Letters Patent is hereby corrected as shown below:

In Title Page (73) Assignee:
delete "Sendec Corporation, Fairport, NY (US)" and insert --SenDEC Corporation, Fairport, NY (US)--

In column 3, line 35,
after "Input terminal" delete "28" and insert --26--.

In column 4, line 13,
after "reference" delete "current" and insert --currents--.

In column 6, line 25,
after "false" delete "trips, it" and insert --trips. It--.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,746,619 B2 | Page 1 of 1 |
| APPLICATION NO. | : 11/741475 | |
| DATED | : June 29, 2010 | |
| INVENTOR(S) | : Sean O. Harnett and David L. Sestito | |

It is certified that error appears in the above-identified patent and that said Letters Patent is hereby corrected as shown below:

In column 8, line 18,
after "current to the" delete "side" and insert --solenoid--.

Signed and Sealed this
Fourteenth Day of August, 2012

David J. Kappos
*Director of the United States Patent and Trademark Office*